(12) United States Patent
Ren et al.

(10) Patent No.: US 10,389,481 B2
(45) Date of Patent: Aug. 20, 2019

(54) METHODS AND APPARATUS FOR CALCULATING TRANSPORT BLOCK (TB) CYCLIC REDUNDANCY CECK (CRC) VALUES

(71) Applicant: Cavium, LLC, Santa Clara, CA (US)

(72) Inventors: Tianmin Ren, Santa Clara, CA (US); Nagabhushana Kurapati, San Jose, CA (US); Fariba Heidari, San Jose, CA (US)

(73) Assignee: Cavium, LLC, Santa Clara, CA (US)

( * ) Notice: Subject to any disclaimer, the term of this patent is extended or adjusted under 35 U.S.C. 154(b) by 32 days.

(21) Appl. No.: 15/716,082

(22) Filed: Sep. 26, 2017

(65) Prior Publication Data
US 2018/0287736 A1  Oct. 4, 2018

Related U.S. Application Data

(60) Provisional application No. 62/480,073, filed on Mar. 31, 2017.

(51) Int. Cl.
*H04L 1/00* (2006.01)
*H04L 1/08* (2006.01)

(52) U.S. Cl.
CPC .......... *H04L 1/0045* (2013.01); *H04L 1/0061* (2013.01); *H04L 1/08* (2013.01)

(58) Field of Classification Search
CPC ....... H04L 1/08; H04L 1/0045; H04L 1/0061; H04L 5/0055; H03M 13/095
See application file for complete search history.

(56) References Cited

U.S. PATENT DOCUMENTS

2016/0226643 A1* 8/2016 Mallik .................. H04L 5/0055
2018/0145703 A1* 5/2018 Li ....................... H03M 13/095

* cited by examiner

*Primary Examiner* — Shelly A Chase
(74) *Attorney, Agent, or Firm* — James M. Wu; JW Law Group

(57) ABSTRACT

In an exemplary embodiment, a method for calculating transport block (TB) cyclic redundancy check (CRC) values includes receiving code blocks (CBs) that form code block groups (CBGs), which form a TB, generating partial TB CRC values from the CBGs, and processing the partial TB CRC values to determine a full TB CRC value. The method also includes comparing the full TB CRC value to a received TB CRC value to determine if the TB has been successfully received. An apparatus includes a receiver that receives CBs that form a TB, and a generator that generates partial TB CRC values from the CBGs. The apparatus also includes a TB CRC checker that processes the partial TB CRC values to determine a full TB CRC value that is compared to a received TB CRC value to determine if the TB has been successfully received.

20 Claims, 4 Drawing Sheets

METHODS AND APPARATUS FOR CALCULATING TRANSPORT BLOCK (TB) CYCLIC REDUNDANCY CECK (CRC) VALUES

CLAIM TO PRIORITY

This application claims the benefit of priority based upon U.S. Provisional Patent Application having Application No. 62/480,073, filed on Mar. 31, 2017, and entitled "METHODS AND APPARATUS FOR CALCULATING TRANSPORT BLOCK (TB) CYCLIC REDUNDANCY CHECK (CRC) VALUES," which is hereby incorporated herein by reference in its entirety.

FIELD

The exemplary embodiments of the present invention relate to the operation of telecommunications networks. More specifically, the exemplary embodiments of the present invention relate to receiving and processing data streams via a wireless communication network.

BACKGROUND

With the rapidly growing trend of mobile and remote data access over high-speed communication networks, such as provided by long term evolution (LTE) cellular networks, the accurate delivery and deciphering of data streams has become increasingly challenging and difficult. For example, in LTE, 5G and other wireless communication systems, transmitted payload data are segmented into Transport Blocks (TBs). A TB cyclic redundancy check (CRC) value is attached to the TB that allows a receiver to determine if the TB is received correctly. Each TB with attached TB CRC is further divided into a number of Code Blocks (CBs). Each CB is encoded separately. One or more CBs can form a CB Group (CBG). A CBG CRC is attached to each CBG that allows the receiver to check if a CBG is received correctly. The encoded CBGs (including attached CRCs) are concatenated and transmitted to a receiving device.

In conventional systems, the CBGs are received at the receiving device and the TB and TB CRC are reassembled from the received CBGs. The entire TB is divided by the appropriate polynomial to produce a calculated CRC value that is compared against the received CRC value. If the CRC values match, the TB is successfully received. However, conventional system need to wait to receive all the CBGs to reconstruct the TB. Once the TB is reconstructed, the CRC polynomial division is performed on the entire received TB to determine whether the TB was successfully received. This process can be very time consuming and inefficient.

Therefore, it is desirable to have a way to efficiently determine if a TB is successfully received at a receiver.

SUMMARY

In various exemplary embodiments, methods and apparatus are provided for calculating a final TB CRC based on partial TB CRC values to determine if a TB is successfully received at a receiver. In various exemplary embodiments, a CRC system is provided that generates partial TB CRC values to determine a final TB CRC value. For example, the system utilizes the property that a remainder of the expression $[(A+B)/C]$ equals the remainder of the expression $(A/C)$ plus the remainder of the expression $(B/C)$. Thus, the disclosed methods and apparatus operate to determine if a TB is successfully received by processing partial TB CRC values determined from received CBs. In an exemplary embodiment, the result is not dependent on the order in which the CBGs are received. The methods and apparatus avoid having to perform a long division of the entire TB with a TB CRC polynomial and therefore operate more efficiently than conventional systems.

In an exemplary embodiment, a method is provided that includes receiving code blocks (CBs) that form one or more code block groups (CBGs). The one or more CBGs form a transport block (TB). The method also includes generating partial TB cyclic redundancy check (CRC) values from the one or more CBGs, and processing the partial TB CRC values to determine a full TB CRC value. The method also includes comparing the full TB CRC value to a received TB CRC value to determine if the TB has been successfully received.

In an exemplary embodiment, an apparatus is provided that includes a receiver that receives code blocks (CBs) that form one or more code block groups (CBGs). The one or more CBGs form a transport block (TB). The apparatus also includes a generator that generates partial TB cyclic redundancy check (CRC) values from the one or more CBGs, and a TB CRC checker that processes the partial TB CRC values to determine a full TB CRC value and compares the full TB CRC value to a received TB CRC value to determine if the TB has been successfully received.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
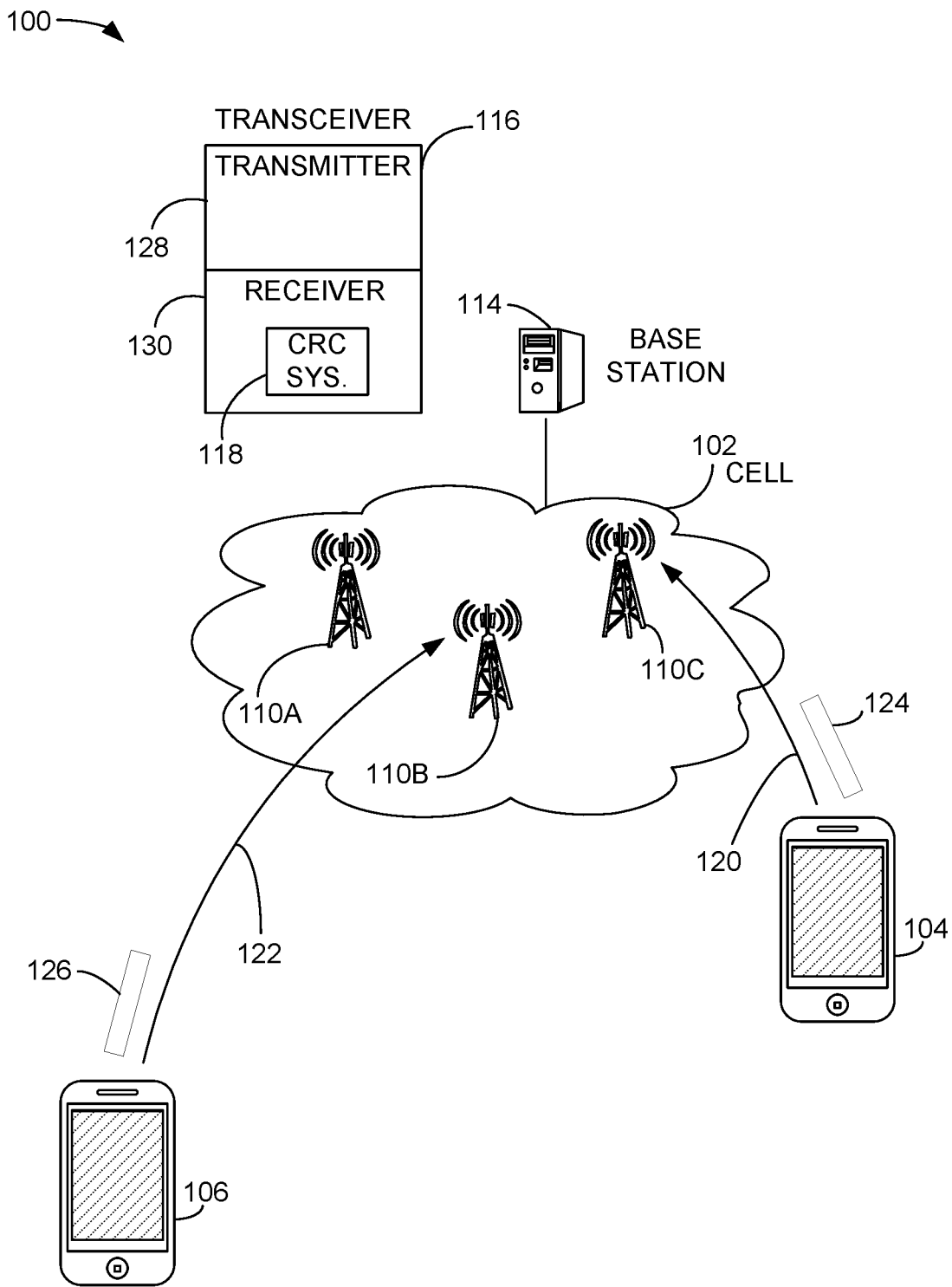
FIG. 1 shows a communication network comprising a transceiver having an exemplary embodiment of a CRC system configured to determine TB CRC values from received CBGs associated with uplink communications from a variety of users.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

FIG. 1 shows a communication network 100 comprising a transceiver 116 having an exemplary embodiment of a CRC system 118 configured to determine TB CRC values from received CBs and CBGs associated with uplink communications from a variety of users. The communication network 100 includes a base station 114 that includes the transceiver 116. The transceiver 116 has a transmitter portion 128 and a receiver portion 130. The base station 114 is configured to communicate with radio towers 110 located in cell site 102.

User equipment (UE) 104 transmits uplink communications 120 to the base station 114 through tower 110c, and user equipment 106 transmits uplink communications 122 to the base station 114 through tower 110b. For example, the UEs can be cellular phones, handheld devices, tablet computers or iPad® devices. It should be noted that the underlying concepts of the exemplary embodiments of the present invention would not change if one or more blocks (or devices) were added or removed from the communication network 100.

Each user equipment transmits payload data that is segmented into Transport Blocks (TBs). A TB cyclic redundancy check (CRC) value is attached to each TB that allows a receiver to determine if the TB is received correctly. Each TB with attached TB CRC is further divided into a number of Code Blocks (CBs). Each CB is encoded separately and includes its own CB CRC value that allows the receiver to check if a CB is received correctly. In an exemplary embodiment, one or more CBs form a CB Group (CBG) or TB segment. A CBG CRC is attached to each CBG that allows the receiver to check if a CBG is received correctly. The encoded CBGs (including attached CRCs) are concatenated and transmitted. For example, the UE 104 transmits concatenated CBGs 124 and the UE 106 transmits concatenated CBGs 126. It should be noted that in an exemplary embodiment, a CBG includes only one CB and thus the apparatus and methods disclosed herein treat each CB as a CBG.

The receiver 130 includes the CRC system 118 that receives the CBGs from the UEs and processes these received CBGs to recover the TBs and associated TB CRCs. In various exemplary embodiments, the CRC system 118 operates to quickly and efficiently determined partial TB CRCs from the received CBGs as they arrive. A final TB CRC is determined from the partial TB CRCs and that final TB CRC is used to determine if the TB was successfully received. In an exemplary embodiment, the system operates independently from the order in which the CBGs are received to determine the partial TB CRC values. In addition, combining the partial CRC values is far more efficient than dividing the received TB by the appropriate polynomial as in conventional systems. A more detailed description of the CRC system 118 is provided below.

Figure 2:
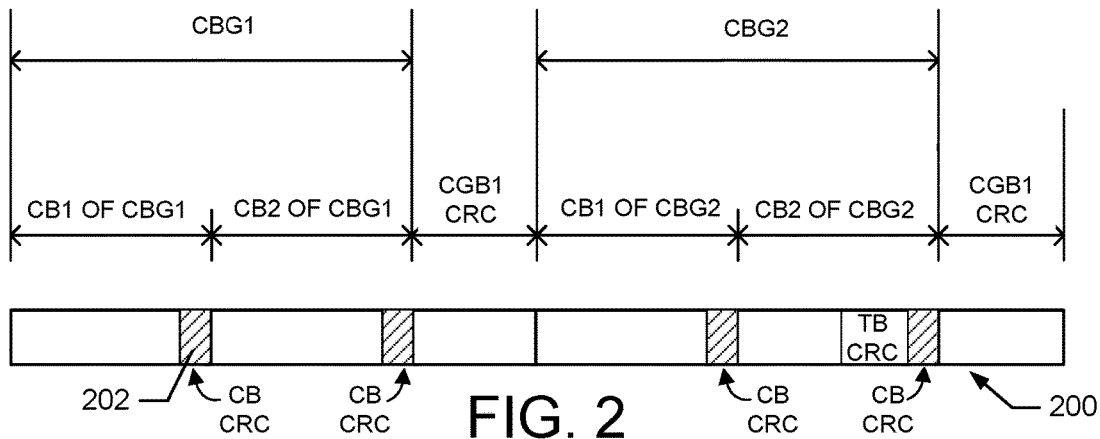
FIG. 2 shows an exemplary diagram of a transport block that includes two CBGs.

FIG. 2 shows an exemplary diagram of a transport block 200 that includes two CBGs (e.g., CBG1 and CBG2). For example, the TB 200 is suitable for use as the TBs 124 or 126 shown in FIG. 1. Each CBG includes two code blocks and a code block CRC. For example, CBG1 includes CB1 and CB2 and CBG1 CRC. CBG2 includes CB1 and CB2 and CBG2 CRC. Each CB includes a CB CRC value such as CB CRC value 202. The diagram also shows the location of the TB CRC bits in CB2 of CBG2.

In an exemplary embodiment, the CBGs of the TB 200 are received and processed in the order they are received by the CRC system 118. For example, partial TB CRC values are determined from the CBs of the received CBGs. Once all the CBs of the received CBGs are processed, the partial TB CRC values are combined to obtain the final TB CRC that is compared to the received TB CRC to determine if the TB was successfully received.

Figure 3:
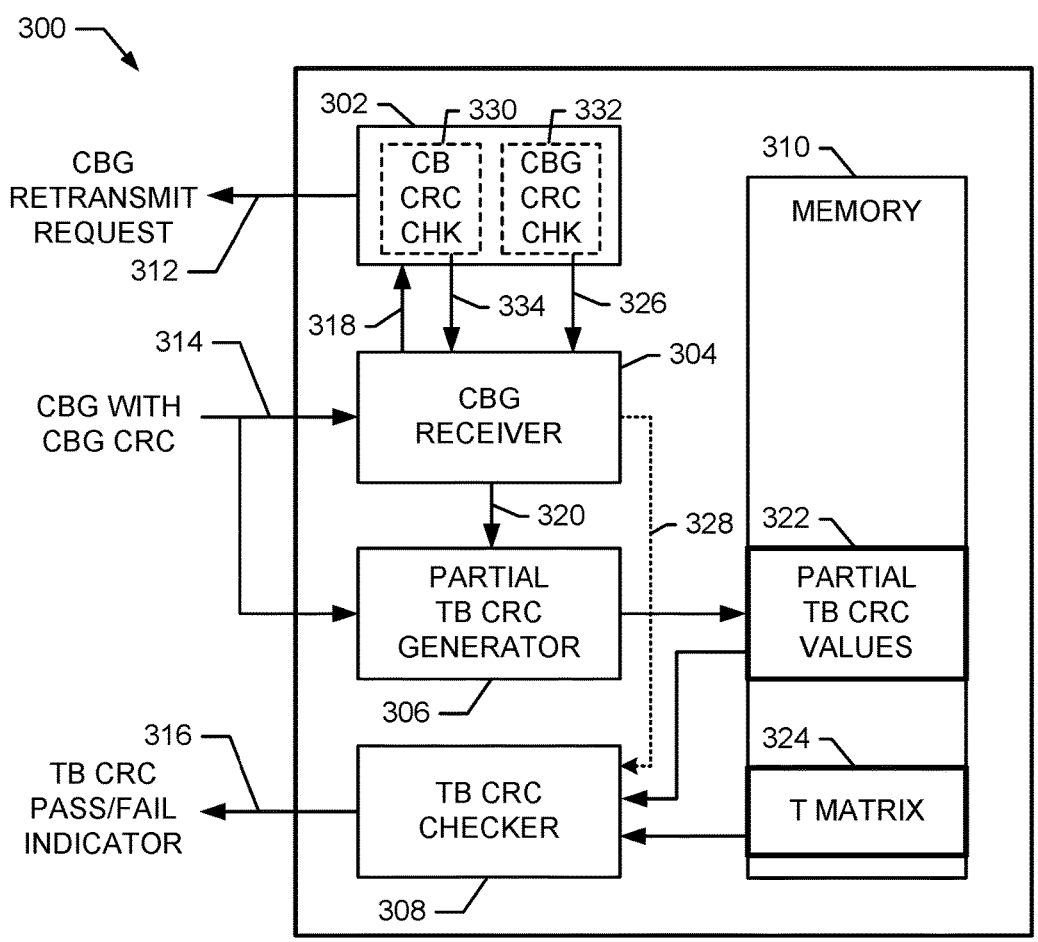
FIG. 3 shows an exemplary embodiment of an CRC system that operates to determine whether a TB is successfully received in accordance with the invention.

FIG. 3 shows an exemplary embodiment of an CRC system 300 that operates to determine whether a TB is successfully received. For example, the CRC system 300 is suitable for use as the CRC system 118 shown in FIG. 1. The CRC system 300 comprises a CRC checker 302, a CBG receiver 304, a partial TB CRC generator 306, a TB CRC checker 308, and a memory 310.

During operation of the CRC system 300, the CBG receiver 304 receives CBGs and CBG CRC values 314. The CBGs and CBG CRC values 314 are also received by the partial TB CRC generator 306. The CBG receiver 304 sends a received CBG and CBG CRC value (as indicate at 318) to the CRC checker 302 to check whether the CBG has been successfully received. It should be noted that the received CBG can include only one CB and therefore the CBG CRC is the CB CRC.

In an exemplary embodiment, the CRC checker 302 comprises a CB CRC checker 330 and a CBG CRC checker 332. During operation one or both of these CRC checkers will be used to determine if CBs and CBGs have been successfully received. For example, the CBG CRC checker 332 calculates a CRC value for a received CBG and compares the calculated CRC with the received CBG CRC to determine if the CBG was successfully received. A CBG pass/fail indicator 326 is sent back to the CBG receiver.

In an exemplary embodiment, the CB CRC checker 330 calculates a CRC value for the received CBs in a CBG and compares the calculated CRC values with the received CB CRC to determine if each CB in a CBG was successfully received. A CB pass/fail indicator 334 is sent back to the CBG receiver. If either a CB CRC failure or a CBG CRC failure is detected by the CRC checker 302, then a retransmit request 312 is sent to the transmitting device. In an exemplary embodiment, the retransmit request 312 requests retransmission of one or more CBs, one or more CBGs, or the entire TB. from the transmitting device.

If the CRC checker 302 determines that the CBs and the CBG were successfully received, the pass/fail indicators 326 and 334 indicate a pass condition to the CBG receiver 304. The CBG receiver 304 sends a pass indicator 320 to the partial TB CRC generator 306, which also has received the CBG and CBG CRC values 314.

In response to the pass indicator 320, the partial TB CRC generator 306 generates a partial TB CRC value from the received CBG and stores this value in the memory 310 as indicated at 322. For example, the partial TB CRC generator 306 generates the partial TB CRC value by dividing the received CBG value by a TB CRC polynomial to obtain a remainder, which is the partial TB CRC value.

The above process continues until all the CBs and CBGs are successfully received. For example, the process continues until all received CBs and CBGs pass the CRC check performed by the CRC checker 302. When this occurs, the CBG receiver 304 send a complete indicator 328 to the TB CRC checker 308 to indicate that all CBs and CBGs have passed the CRC check and have been successfully received.

In response to receiving the complete indicator 328, the TB CRC checker 308 operates to process the partial TB CRC values 322 to determine if the TB as successfully received. For example, the TB CRC checker 308 obtains the partial TB CRC values 322 and T matrix values 324 from the memory 310. The T matrix values 324 are pre-calculated and stored values that are used by the TB CRC checker 308 to process the partial TB CRC values 322 to determine a TB CRC pass/fail indicator 316. A more detailed description of the operation of the TB CRC checker 308 is provided in another section below. Thus, the CRC system 300 generates partial TB CRC values 322 that are used to determine whether a TB has been successfully received. The CRC system 300 operates more efficiently than conventional systems since the stored T matrix 324 is used in a simple multiplication process that avoids polynomial division of the entire TB for the purpose of CRC checking.

Figure 4:
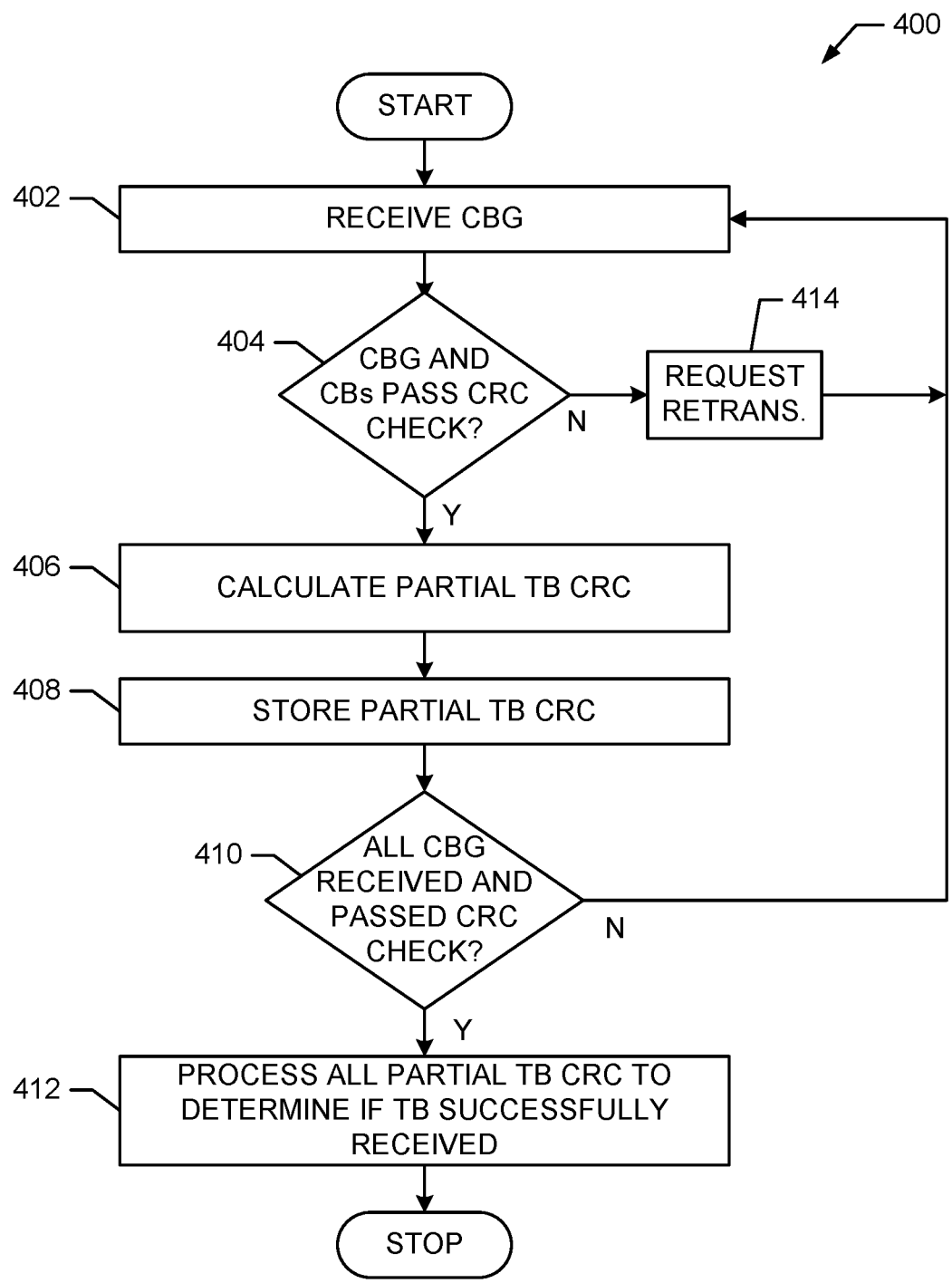
FIG. 4 shows an exemplary embodiment of a method for determining whether a TB is successfully received based on partial TB CRC values in accordance with the invention.

FIG. 4 shows an exemplary embodiment of a method 400 for determining whether a TB is successfully received based on calculated partial TB CRC values. For example, the method 400 is suitable for use with the CRC system 300 shown in FIG. 3. The method 400 operates to process received CBGs to determine partial TB CRCs. When all CBGs have been successfully received, the partial TB CRC values are processed to determine if the TB has been successfully received. The method 400 can also be used when there is only one CB in a CBG or when only CBs are received with no CBG organization. Thus, the method avoids having to perform a long division of the TB with a CRC polynomial to recalculate the TB CRC.

At block 402, a CBG and its CBG CRC are received. The CBG comprises one or more code blocks (CBs). In an exemplary embodiment, the CBG can also be referred to as a "segment" of the TB. In an exemplary embodiment, the CBG and its CBG CRC are received by the CBG receiver 304.

At block 404, a determination is made as to whether received CBs and the CBG passed the CRC checks. For example, in an exemplary embodiment, the CBG is divided by a CBG CRC polynomial and the remainder forms the CBG CRC value. The calculated CBG CRC value is compared to the received CBG CRC value to determine if the CBG was successfully received. A similar process is performed for each CB in the CBG. In an exemplary embodiment, the calculation of the CRC values and the comparison to the received CRC values is performed by the CRC checker 302. If the CBG or any of the CBs were not successfully received, then the method proceeds to block 414, where a request for retransmission of one or more CBs, a CBG, or the entire TB is sent and then the method proceeds to block 402. If the CBG and all of the CBs were successfully received, then the method proceeds to block 406. In an exemplary embodiment, the determination as to whether the CBG and the associated CBs were successfully received is performed by the CRC checker 302.

At block 406, a partial TB CRC is calculated based on the received CBG. For example, in an exemplary embodiment, the CBG is divided by a TB CRC polynomial and the remainder forms the partial TB CRC value. For example, the partial TB CRC is calculated by the partial TB CRC generator 306. In an exemplary embodiment, the operations at blocks 402, 404, and 406 are performed in parallel.

At block 408, the partial TB CRC value calculated at block 406 is stored in a memory. In an exemplary embodiment, the partial TB CRC value calculated at block 406 is stored in the memory 310 by the partial TB CRC generator 306.

At block 410, a determination is made as to whether all CBGs have been received and have successfully passed the CB and CBG CRC checks. If all CBGs have not be successfully received, the method proceeds to block 402. If all CBGs have been successfully received, the method proceeds to block 412. In an exemplary embodiment, the determination as to whether all CBGs have been received and have successfully passed the CBG CRC check is made by the CBG receiver 304.

At block 412, all partial TB CRC values are processed to determine if the TB was successfully received. In an exemplary embodiment, all partial TB CRC values are processed by the TB CRC checker 308 to determine if the TB was successfully received. A more detailed description of the operations performed at block 412 are provided in another section below.

Thus, the method 400 operates to determine if a TB is successfully received by processing partial TB CRC values determined from received CBGs. In an exemplary embodiment, the method is not dependent on the order in which the CBGs are received. The method avoids having to wait for the entire TB to be received and then performing a long division of the entire TB with a TB CRC polynomial to recalculate the TB CRC and therefore is more efficient than conventional systems.

Figure 5:
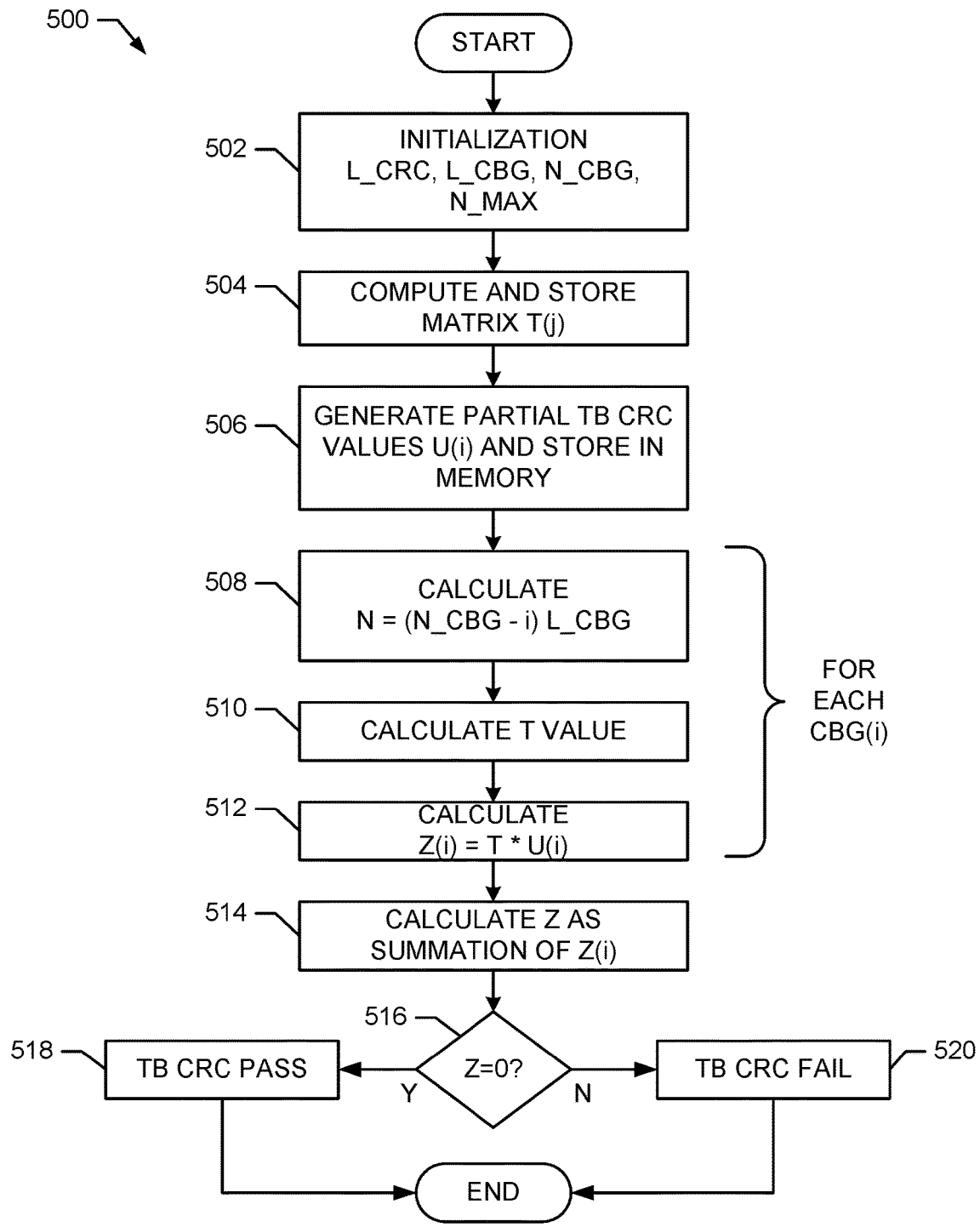
FIG. 5 shows an exemplary embodiment of a method for determining whether a TB is successfully received based on partial TB CRC values in accordance with the invention.

FIG. 5 shows an exemplary embodiment of a method 500 for determining whether a TB is successfully received based on partial TB CRC values. For example, in an exemplary embodiment, the method 500 is suitable for use by the CRC system 300 shown in FIG. 3. The method 500 operates to process received CBGs to determine partial TB CRCs. When all CBGs have been successfully received, the partial TB CRC values stored in memory are processed to determine if the TB has been successfully received.

At block 502, initialization is performed to define L_CRC and L_CBG as the TB CRC length and CBG length respectively, and N_CBG as the number of CBGs. A parameter N_max=2^ceil (log 2(max TB length)).

At block 504, a matrix T is computed and stored. For example, given X=[1, 1, . . . 1] with a length of L_CRC. A remainder of polynomial division ([X;0]/CRC_polynomial) is calculated, which results in a length L_CRC vector Y. The matrix T is computed such that Y=TX. The values of T(j) are calculated and stored where (j=1 to N_max) such that:

T(1)=T

T(2)=T(1)×T(1)

T(4)=T(2)×T(2) and so forth until all the desired values of the matrix T are calculated and stored. For example, the T matrix 324 is stored in the memory 310 as shown in FIG. 3.

At block 506, partial TB CRC values (designated U(i)) are generated and stored in memory. For example, the partial TB CRC generator 306 generates the partial TB CRC values 322 and stores them in the memory 310. For example, in an exemplary embodiment, the method 400 can be used to generate and store the partial TB CRC values "U(i)."

For each CBG(i) where (i=1, 2, . . . N_CBG), the operations of blocks 508, 510 and 512 are performed.

At block 508, a value of N is calculated. In an exemplary embodiment, the value of N is calculated as [N=(N_CBG−i)*L_CBG].

At block 510, a T value is calculated. In an exemplary embodiment, a binary representation of N is defined as $(b_{N\_max} \ldots b_1 b_0)$. Then the value T is defined by the expression $T=(T(N\_max)^{bN\_max-1} \ldots (T1)^{b0})$. For example, the value T is calculated using the T(j) matrix determined above that is stored in memory.

At block 512, values for Z(i) are calculated. In an exemplary embodiment, the values of Z(i) are calculated from $Z(i)=T*U(i)$.

At block 514, a value of Z is calculated by summing the values of Z(i). For example, in an exemplary embodiment, the summation $Z=\Sigma_{i=1}^{N\_CBG} Z(i)$ is calculated to determine a value for Z.

At block 516, a determination is made as to whether the value of Z is equal to zero. If (Z=0), the method proceeds to block 518, otherwise the method proceeds to block 520.

At block 518, Z is determined to be zero so the TB CRC check passes and the TB is successfully received.

At block 520, Z is not determined to be zero so the TB CRC check fails and the TB is not successfully received.

In an exemplary embodiment, the operations of blocks 508 through 520 are performed within block 412 of the method 400 shown in FIG. 4 and performed by the TB CRC checker 308 shown in FIG. 3.

Thus, the method 500 operates to determine if a TB is successfully received by processing partial TB CRC values determined from received CBGs. In an exemplary embodiment, the method is not dependent on the order in which the CBGs are received. The method avoids having to perform a long division of the entire TB with a TB CRC polynomial to recalculate the TB CRC and therefore is more efficient than conventional systems.

While particular embodiments of the present invention have been shown and described, it will be obvious to those skilled in the art that, based upon the teachings herein, changes and modifications may be made without departing from these exemplary embodiments of the present invention and their broader aspects. Therefore, the appended claims are intended to encompass within their scope all such changes and modifications as are within the true spirit and scope of this exemplary embodiments of the present invention.

What is claimed is:

1. A method of receiving information by a receiver via a wireless communication network, comprising:
   receiving code blocks (CBs) that form one or more code block groups (CBGs), and wherein the one or more CBGs form a transport block (TB);
   generating partial TB cyclic redundancy check (CRC) values from the one or more CBGs;
   processing the partial TB CRC values to determine a full TB CRC value; and
   comparing the full TB CRC value to a received TB CRC value to determine if the TB has been successfully received, wherein the generating partial TB CRC values includes generating the partial TB CRC values from successfully received CBGs and determining a received CBG to be successfully received if each CB within the received CBG passes a CRC check.

2. The method of claim 1, further comprising requesting retransmission of at least one of a CB, a CBG, or the TB, if any CB or CBG is not successfully received.

3. The method of claim 1, wherein the operation of generating the partial TB CRC values comprises:
   dividing the successfully received CBGs by a TB CRC polynomial to generate the partial TB CRC values, wherein a remainder of each division operation represents one of the partial TB CRC values; and
   storing the partial TB CRC values in a memory.

4. The method of claim 1, wherein the operation of generating the partial TB CRC values comprises determining a received CBG to be successfully received if it passes a CRC check.

5. The method of claim 1, wherein the operation of processing the partial TB CRC values comprises:
   For each CBG(i), performing operations of:
      calculating a value N;
      calculating a value T from the value N and a T matrix stored in memory; and
      calculating a value Z(i) based on the partial TB CRC values and the value T; and
   summing the Z(i) values to determine if the TB was successfully received.

6. The method of claim 5, wherein the operation of calculating the value of N comprises calculating the value of N from $[N=(N\_CBG-i)*L_{\_CBG}]$, wherein $_N\_$CBG is a total number of CBGs, and L_CBG is a length of a CBG.

7. The method of claim 5, wherein the operation of calculating the value of T comprises:
   determining a binary representation of N expressed as (bN_max . . . b1 b0); and
   calculating the value of T from an expression [T=(T(N_max) bN_max-1 . . . (T1) b0)].

8. The method of claim 5, wherein the operation of calculating the value Z(i) is performed by calculating an expression [Z(i)=T*U(i)], wherein U(i) is a selected partial TB CRC value.

9. The method of claim 5, wherein the operation of summing comprises determining the TB was successfully received if the sum of the Z(i) values is equal to zero.

10. An apparatus capable of receiving information via a wireless communication network, comprising:
   a receiver that receives code blocks (CBs) that form one or more code block groups (CBGs), and wherein the one or more CBGs form a transport block (TB);
   a generator that generates partial TB cyclic redundancy check (CRC) values from the one or more CBGs; and
   a TB CRC checker that processes the partial TB CRC values to determine a full TB CRC value and compares the full TB CRC value to a received TB CRC value to determine if the TB has been successfully received,
   wherein the generator generates the partial TB CRC values from successfully received CBGs, and generates the partial TB CRC values by dividing the successfully received CBGs by a TB CRC polynomial, wherein a remainder of each division operation represents one of the partial TB CRC values, and wherein the generator stores the partial TB CRC values in a memory.

11. The apparatus of claim 10, further comprising a CRC checker that requests retransmission of at least one of a CB, a CBG, or the TB, if any CB or CBG is not successfully received.

12. The apparatus of claim 10, wherein for each CBG(i), the TB CRC checker performs operations of:
   calculating a value N;

calculating a value T from the value N and a T matrix stored in memory; and calculating a value Z(i) based on the partial TB CRC values and the value T; and summing the Z(i) values to determine if the TB was successfully received.

13. The apparatus of claim 12, wherein the TB CRC checker calculates the value of N from [N=(N_CBG−i)*L_CBG], wherein N_CBG is a total number of CBGs, and L_CBG is a length of a CBG.

14. The apparatus of claim 12, wherein the TB CRC checker calculates the value of T by determining a binary representation of N expressed as (bN—max . . . b1 0), and calculating the value of T from an expression [T=(T(N_max) bN_max-1. . . (T1) 0)].

15. The apparatus of claim 12, wherein the TB CRC checker calculates the value Z(i) from [Z(i)=T*U(i)], wherein U(i) is a selected partial TB CRC value.

16. The apparatus of claim 12, wherein the TB CRC checker determines that the TB was successfully received if the sum of the Z(i) values is equal to zero.

17. A method of receiving information by a receiver via a wireless communication network, comprising:

receiving code blocks (CBs) that form one or more code block groups (CBGs), and wherein the one or more CBGs form a transport block (TB);

generating partial TB cyclic redundancy check (CRC) values from the one or more CBGs;

processing the partial TB CRC values to determine a full TB CRC value; and comparing the full TB CRC value to a received TB CRC value to determine if the TB has been successfully received, wherein the processing the partial TB CRC values further includes:

for each CBG(i), performing operations of:

calculating a value N;

calculating a value T from the value N and a T matrix stored in memory; and calculating a value Z(i) based on the partial TB CRC values and the value T;

summing the Z(i) values to determine if the TB was successfully received.

18. The method of claim 17, wherein the calculating the value of N includes calculating the value of N from [N=(N_CBG−i)*L_CBG], wherein N_CBG is a total number of CBGs, and L_CBG is a length of a CBG; and wherein the calculating the value of T includes determining a binary representation of N expressed as (bN$_{13}$ max . . . b1 b0); and calculating the value of T from an expression [T=(T(N$_{13}$ max) bN$_{13}$ max-1. . . (T1) b0)].

19. A receiver capable of receiving information via a wireless communication network, comprising:

a receiver that receives code blocks (CBs) that form one or more code block groups (CBGs), and wherein the one or more CBGs form a transport block (TB);

a generator that generates partial TB cyclic redundancy check (CRC) values from the one or more CBGs; and a TB CRC checker that processes the partial TB CRC values to determine a full TB CRC value and compares the full TB CRC value to a received TB CRC value to determine if the TB has been successfully received, wherein for each CB G(i), the TB CRC checker performs operations of:

calculating a value N;

calculating a value T from the value N and a T matrix stored in memory; and calculating a value Z(i) based on the partial TB CRC values and the value T; and summing the Z(i) values to determine if the TB was successfully received.

20. The receiver of claim 19, wherein the TB CRC checker calculates the value of N from [N=(N_CBG−i)*L_CBG], wherein N_CBG is a total number of CBGs, and L_CBG is a length of a CBG.

* * * * *